US00RE40219E

(19) United States
(12) Reissued Patent
Bonningue

(10) Patent Number: US RE40,219 E
(45) Date of Reissued Patent: Apr. 8, 2008

(54) DIAPHRAGM PUMP COMPRISING ON AT LEAST A PORTION OF ITS PERIPHERY PREFERRED DEFORMATION ZONE AND A RECEPTACLE FITTED THEREWITH

(75) Inventor: Philippe Bonningue, Paris (FR)

(73) Assignee: L'Oreal, Paris (FR)

(21) Appl. No.: 10/383,545

(22) Filed: Mar. 10, 2003

Related U.S. Patent Documents

Reissue of:
(64) Patent No.: 6,299,029
Issued: Oct. 9, 2001
Appl. No.: 09/564,667
Filed: May 4, 2000

(30) Foreign Application Priority Data

May 6, 1999 (FR) ..... 99 05772

(51) Int. Cl.
*B65D 37/00* (2006.01)

(52) U.S. Cl. ..... 222/207; 222/321.7
(58) Field of Classification Search ..... 222/207, 222/321.7, 321.2
See application file for complete search history.

(56) References Cited

U.S. PATENT DOCUMENTS 4,890,773 A 1/1990 Corsette
5,704,519 A 1/1998 Crosnier et al.
6,202,896 B1 3/2001 Bonningue

FOREIGN PATENT DOCUMENTS

FR 2 728 809 * 7/1996
FR 2728809 7/1996

* cited by examiner

*Primary Examiner*—Philippe Derakshani
(74) *Attorney, Agent, or Firm*—Oliff & Berridge, PLC

(57) ABSTRACT

The invention provides a pump of type comprising a moving member mounted to move relative to a support, the moving member having a central duct into which the substance to be dispensed penetrates via at least one opening, the support co-operating with the moving member to define a variable volume pump chamber around said central duct, the pump also having a diaphragm having a central portion in the form of a sleeve that is open at its top end and closed at its bottom end, said central duct being inserted in said central portion, the diaphragm being organized in such a manlier as to isolate the opening(s) of the pump chamber when the volume of the pump chamber increases and the substance is sucked into it. The bottom portion of the central portion of the diaphragm presents, at least over a sector of its periphery, a preferred deformation zone.

45 Claims, 6 Drawing Sheets

DIAPHRAGM PUMP COMPRISING ON AT LEAST A PORTION OF ITS PERIPHERY PREFERRED DEFORMATION ZONE AND A RECEPTACLE FITTED THEREWITH

Matter enclosed in heavy brackets [ ] appears in the original patent but forms no part of this reissue specification; matter printed in italics indicates the additions made by reissue.

The present invention relates to a pump and to a receptacle containing a liquid, for example a cosmetic cream, and fitted with such a pump.

BACKGROUND OF THE INVENTION

French patent 2 728 809 discloses a pump comprising a pushbutton displaceably mounted on a support which is secured to the receptacle containing the substance to be dispensed, the pushbutton having a circularly cylindrical central duct provided with radial openings at its bottom end, the support defining an annular pump chamber of variable volume around said duct. A diaphragm made of elastomer is mounted on the support. The diaphragm has a circularly symmetrical central portion in the form of a sleeve that is open at its top end and closed at its bottom end. The central duct of tile pushbutton is inserted in the diaphragm until it bears against the end wall of the sleeve.

The diaphragm thus constitutes a resilient return member enabling the pushbutton to be returned to its initial position after a quantity of substance has been dispensed.

Also, during the return movement of the pushbutton, the diaphragm isolates the pump chamber by pressing against the central duct, thereby preventing air returning into the chamber.

Such a pump presents the advantage of having only a small number of parts and thus of being of relatively low cost to manufacture.

Nevertheless, that known pump does not provide complete satisfaction, and the Applicant company has observed that the pushbutton tends to jam and/or to dispense non-uniform quantities of substance.

In addition, such a pump suffers from difficulties in priming.

OBJECTS AND SUMMARY OF THE INVENTION

The present invention seeks to improve the reliability of the operation of a pump of the above-defined type, i.e. comprising a moving member mounted to move relative to a support, the moving member having a central duct into which the substance to be dispensed penetrates via at least one opening, the support cooperating with the moving member to define a variable volume pump chamber around said central duct, the pump also having a diaphragm having a central portion in the form of a sleeve that is open at its top end and closed at its bottom end, said central duct being inserted in said central portion, the diaphragm being organized in such a manner as to isolate the opening(s) of the pump chamber when the volume of the pump chamber increases and the substance is sucked into it.

The invention achieves this by the fact that the bottom portion of the central portion of the diaphragm presents, at least over a sector of its periphery, a preferred deformation zone, advantageously constituted by a thin zone.

By means of the preferred deformation zone(s), it is possible to make a pump in which the central portion of the diaphragm exerts a relatively large return force on the moving member so as to return it to the rest position, without that preventing the substance contained in the pump chamber from reaching the central duct so as to be dispensed when the user presses on the moving member.

In a particular embodiment, the bottom portion of the central portion of the diaphragm has at least two diametrically opposite thin zones.

Still in a particular embodiment, the thin zone is formed by reducing the thickness of the diaphragm by at least 20%, and preferably by at least 25%.

Advantageously, the inside surface of the central portion of the diaphragm presents an inwardly-directed step.

Preferably, said step is situated level with the top end of the preferred deformation zone(s).

In a particular embodiment, the diaphragm has a flexible lip suitable firstly for isolating the pump chamber from the source of substance when the volume of said pump chamber decreases, and secondly for enabling substance to enter into said pump chamber when the volume thereof increases.

In a particular embodiment, said flexible lip is connected to the central portion of the diaphragm by forming a downwardly open annular trough, and the support includes an inner shirt having its top end bearing against the end wall of said trough to retain the diaphragm when the moving member is moved downwards to decrease the volume of the pump chamber.

Preferably, said inner skirt has openings at its top end, the openings being of a height that is less than the height of the flexible lip, said openings enabling the substance to reach the pump chamber when the volume thereof increases and the flexible lip moves away from the inner skirt.

In a particle embodiment, the central portion of the diaphragm is connected at its top end to an annular portion whose width and thickness are selected in such a manner as to improve retention of the diaphragm when said central portion is stretched.

Preferably, the thickness of the above-mentioned annular portion, prior to the diaphragm being assembled in the pump, is greater than or equal to the thickness of the diaphragm in its central portion.

Preferably, the above-mentioned annular portion, prior to the diaphragm being assembled in the pump, is at least 1.5 times wider than it is thick, and preferably twice as wide as it is thick.

Advantageously, the end wall of the central portion of the diaphragm, prior to the diaphragm being assembled in the pump, presents substantially the same thickness as the side wall of the central portion of the diaphragm outside said preferred deformation zone(s).

Preferably, the thickness of the end wall corresponds to within 20% to the thickness of the side wall of the central portion of the diaphragm, outside said preferred deformation zone(s), prior to the diaphragm being mounted in the pump.

In a particular embodiment, the height of the above-mentioned flexible lip is greater than or equal to tie height of the central portion of the diaphragm, prior to the diaphragm being assembled in the pump.

In a particular embodiment, the flexible lip is of thickness that increases going towards the top end of the diaphragm.

In a particular embodiment, the outside surface of the flexible lip presents, starting from its bottom end, a bottom portion that is circularly cylindrical about the axis of the central portion of the diaphragm, followed by an upper portion that is conical and diverges towards the top end of the diaphragm, which upper portion is connected via a shoulder to an annular rib.

Preferably, the inside diameter of the flexible lip is equal to the outside diameter of the inner skirt, ignoring manufacturing tolerances.

Also preferably, the clearance between the flexible lip and the inner skirt is negative or zero; this ensures that the flexible lip is lightly clamped against the inner skirt.

In a particular embodiment, when the moving member is at rest, the length of the central portion of the diaphragm after being assembled in the pump is greater than or equal to 1.5 times its initial length prior to assembly in the pump, and is preferably greater than or equal to twice said initial length, and more preferably greater than or equal than 3 times said initial length.

In a particular embodiment, when tile moving member is fully depressed, the length of the central portion of the diaphragm is greater than or equal to twice the initial length of the diaphragm prior to assembly in the pump, is preferably greater than or equal to 3 times said initial length, and more preferably greater than or equal to 4 times said initial length.

In a particular embodiment, at least one of the diaphragm and the central duct is shaped to prevent an annular zone forming between the diaphragm and the central duct that would prevent the substance contained in the pump chamber from flowing via said central duct when the volume of the pump chamber decreases.

Preferably, at least one of the diaphragm and the central duct is shaped so as to bear against the other of the central duct and the diaphragm at predetermined locations of its periphery, at least during displacement of the moving member relative to the support.

Preferably, at least one of the diaphragm and the central duct has portions in relief against which the other of the central duct and the diaphragm codes to bear; at least during displacement of the moving member relative to the support.

This guarantees that the pump operates reliably without any risk of the moving member jamming while the volume of the pump chamber is varying.

The above-mentioned portions in relief tend to prevent the diaphragm from blocking the flow of substance coming from the pump chamber and going towards the opening(s) of the central duct via which the substance penetrates prior to being dispensed while the volume of the pump chamber is decreasing.

These portions in relief also tend to keep the central duct of the moving member on the axis of the central portion of the diaphragm, which is favorable to satisfactory operation of the pump.

In a preferred embodiment, said portions in relief are made on the diaphragm, preferably being constituted by bulges uniformly distributed around the axis of the central portion of the diaphragm at its opening, said bulges preferably extending over the top face of the diaphragm.

In a particular embodiment, the support has a pair of sealing lips bearing in leakproof manner on a tubular skirt of the moving member, said tubular skirt being downwardly open and extending around the central duct concentrically thereabout, said tubular skirt also defining the pump radially outer wall of the pump chamber.

In a particular embodiment, the inner skirt is a portion of a piece fitted to the remainder of the support.

In a preferred embodiment, the central duct of the moving member is provided with at least one radial opening at its bottom end.

In a preferred embodiment, the moving member constitutes a pushbutton, the central duct being integrally formed with a dispenser endpiece.

In a particular embodiment, the tubular skirt of the moving member slides inside a guide skirt of the support, co-operating with the inner skirt of the support to define an upwardly open annular trough which communicates with the source of substance via at least one air intake orifice, the tubular skirt of the moving member bearing in leakproof manner against side guide skirt when the moving member is at rest and the volume of the pump chamber is at a maximum.

The diaphragm can be made of a nitrile elastomer or of a silicone elastomer.

In a particular embodiment, the pump has a return spring for returning the moving member towards an initial position after a quantity of substance has been dispensed.

Advantageously, the return spring is constituted by a helical spring working in compression.

Preferably, the spring is disposed on the axis of the membrane so that the top end of the spring bears against the bottom end of the central portion of the membrane.

The presence of a return spring is advantageous since it makes it possible to have a wider choice of materials for consistuting the membrane since the membrane need not be prestressed or it can be prestressed, but only to a relatively small extent.

The presence of a spring also enlarges the range of substance that can be dispensed, since it becomes easier to find a membrane material that is compatible with the substance for dispensing.

The invention also provides a receptacle fitted with a pump as defined above.

BRIEF DESCRIPTION OF THE DRAWINGS

Other characteristics and advantages of the present invention will appear on reading the following detailed description of a non-limiting embodiment of the invention and of a variant implementation, and on examining the accompanying drawings, in which.

MORE DETAILED DESCRIPTION

Figure 1:
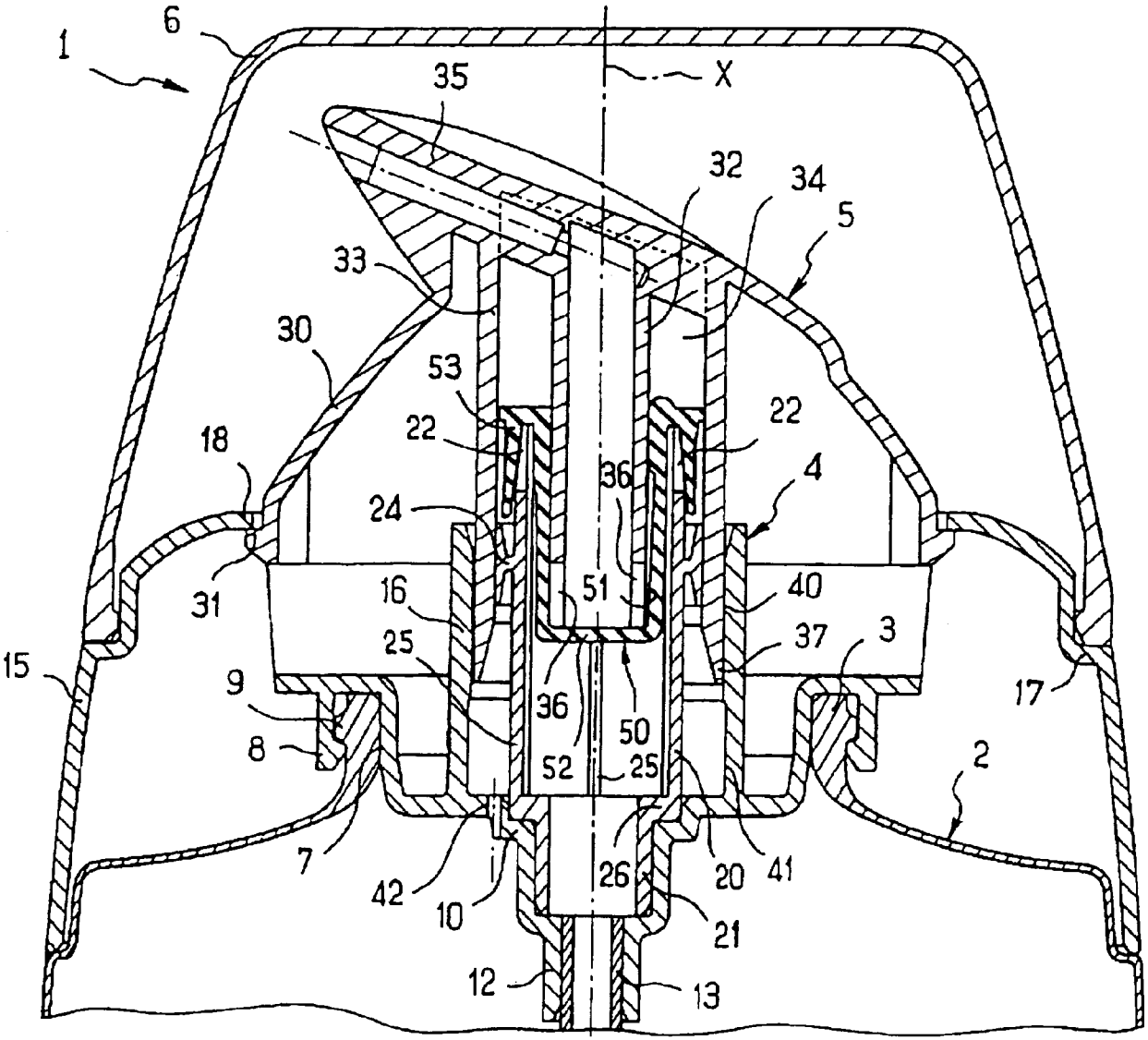
FIG. 1. is a diagrammatic view of the top portion of a receptacle fitted with a pump of the invention.

FIG. 1 shows a receptacle 1 comprising a tank forming body 2 of which only the top end is shown in the drawing, defining a neck 3 on which a support 4 is snap-fastened.

The support 4 guides a pushbutton 5 in sliding along an axis X, and it serves to mount a removable protective cap 6 Covering the pushbutton 5 prior to first use.

The support 4 has a sealing skirt 7 bearing in leakproof manner against the inside surface of the neck 3.

The sealing skirt 7 is extended radially, firstly outwards by fixing tabs 8 snap-fastened on an annular rim 9 of the neck 3, and secondly inwards in the form of a stepped wall 10 defining an endpiece 12 for connecting a dip tube 13, shown in part in the drawing.

An outer skirt 15 and a guide skirt 16 are integrally formed together with the sealing skirt 7, the fixing tabs 8, and the stepped wall 10 by molding a plastics material.

The outer skirt 15 extends around the neck 3 of the receptacle and presents a shoulder 17 on which the protective cap 6 bears.

The top edge 18 of the outer skirt 15 holds the pushbutton 5 at rest, as explained below.

The support 4 has an inner skirt 20 constituted by a separate part, with a bottom end 21 having a shoulder that is engaged by force into the stepped wall 10.

Figure 2:
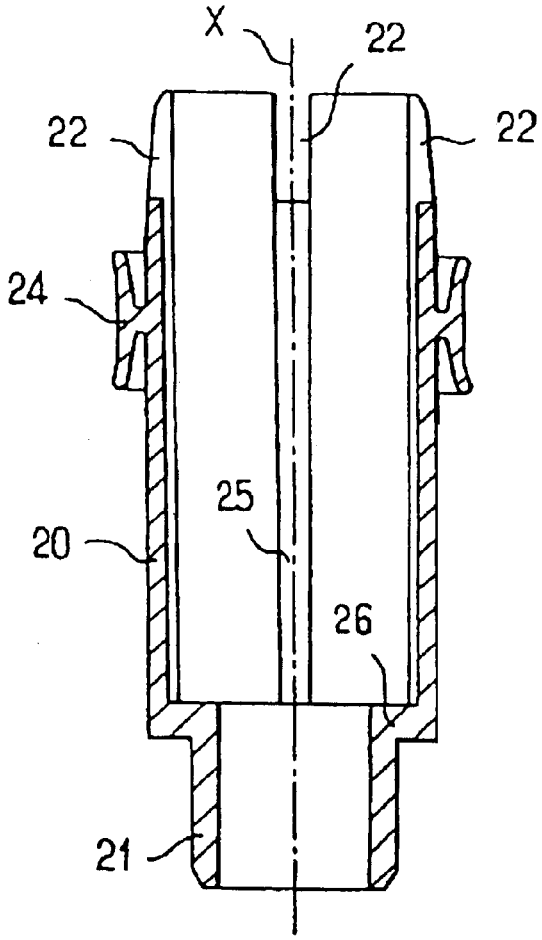
FIGS. 2 and 3 show the Inner skirt of the support in isolation.
Figure 3:
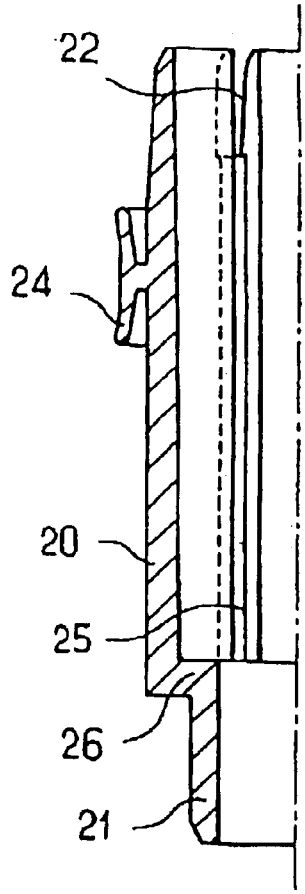

The inner skirt 20 has a substantially tapering top end provided with openings 22, as can be seen more particularly in FIGS. 2 and 3.

In the example described, these openings 22 are in the form of slots running parallel to the axis X and extended downwards by grooves 25 occupying the radially inner surface of the inner skirt 20 as far as a step 26. A pair of annular sealing lips 24 are integrally formed with the inner skirt 20 by molding a plastics material.

The pushbutton 5 has an outer skirt 30 provided at its bottom end with teeth 31, which teeth come into abutment against the top edge 18 of the outer skirt 15 of the support 4 when the pushbutton 5 is at rest in its high position, as shown in FIG. 1.

The pushbutton 5 has a central duct 32 on the axis X, and a concentric tubular skirt 33 defining an annular pump chamber 34 around the central duct 32.

The outer skirt 30, the tubular skirt 33, and the central duct 32 are formed integrally with a dispenser endpiece 35 communicating internally with the central duct 32 by holding a plastics material.

At its bottom end, the central duct 32 has radial openings 36, there being four of them in the example described, which openings are uniformly distributed around the axis X. Each opening 26 is in the form of a narrow slot.

Figure 4:
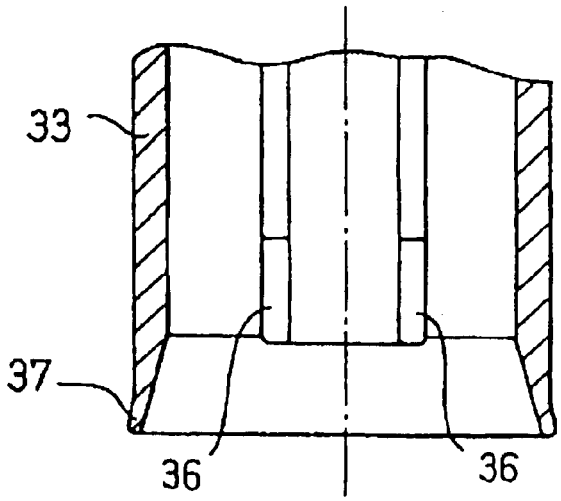
FIG. 4 shows a fragment of the bottom end of the tubular skirt of the moving member in isolation.

The bottom end of the tubular skirt 33 forms a sealing lip 37 extending radially outwards to a small extent, as is shown more particularly in FIG. 4. The bottom portion of the guide skirt 16 of the support 4 has a shallow annular setback 41 in its radially inner surface.

When the pushbutton 5 is in the high position, the sealing lip 37 presses in leakproof manner against the circularly cylindrical surface 40 of the top portion of the guide skirt 16, as shown in FIG. 1.

The inside of the receptacle is thus isolated from ambient air, which is favorable to good conservation of the substance to be dispensed.

When the pushbutton 5 is pressed down, the sealing lip 37 ceases to bear in leakproof manner against the guide skirt 16 because of the annular setback 41, thereby enabling the trough formed between the inner skirt 20 and the guide skirt 16 to communicate with the outside.

An air intake orifice 42 is formed in the bottom of this trough to allow air to penetrate into the receptacle progressively as it empties.

The inner skirt 20 serves as a mount for a diaphragm having a sleeve-shaped central portion 51 about the axis X which is open at its top end and closed at its bottom end by an end wall 52.

Figure 5:
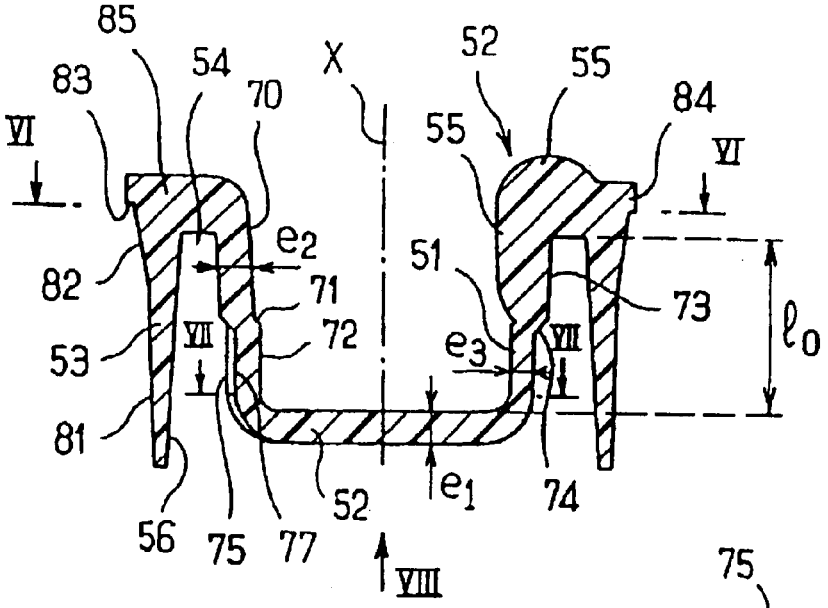
FIG. 5 is a diagrammatic axial section showing in isolation the diaphragm for fitting to the pump 1, prior to being assembled in the pump.
Figure 6:
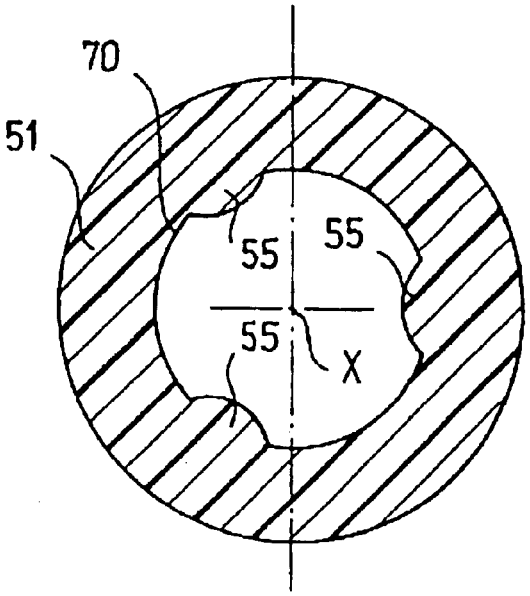
FIG. 6 is a section on section line VI-VI of FIG. 5.

This central portion 51 is extended radially outwards by a flexible annular lip 53, as can be seen more particularly in FIGS. 5 and 6.

By connecting with the central portion 51, this flexible lip 53 forms an annular trough 54 in which the top end of the inner skirt 20 is inserted until its free edge bears against the end wall of said tough.

The flexible lip 53 is made in such a manner as to clamp lightly on the inner skirt 20.

The height of the flexible lip 53 is greater than the height of the openings 22, and the flexible lip 53 is suitable at rest for bearing in leakproof manner via its inner surface 56 against the radially outer surface of the inner skirt 20 beyond the openings 22, as shown in FIG. 1.

The flexible lip 53 can deform radially outwards to enable substance to reach the pump chamber 34, as described in greater detail below.

At the opening of its central portion 51, the diaphragm 50 has portions in relief that are not circularly symmetrical about the axis X, i.e. in this particular example bulges 55 whose function is explained below.

In the embodiment described, there are three of these bulges 55 and they are uniformly distributed angularly about the axis X, as can be seen in FIG. 6.

Each of these bulges 55 projects from the radially inner surface of the central portion 51 over about half the height thereof (prior to being assembled in the pump) starting from the top end, and each extends radially outwards over the top face of the diaphragm 50 so as substantially to overlie the trough 54, as can be seen in FIG. 5.

Each of the bulges 55, when observed in section in a cross-section plane, also presents a section that is convex towards the axis X, as shown in FIG. 6.

The inside surface of the central portion 51 of the diaphragm has a top portion 10 that is slightly conical towards the end wall 52.

The bulges 55 are formed on this conical portion 10, as can be seen in FIG. 5.

The conical surface 70 is connected via an inwardly-directed step 71 to a surface 72 that is circularly cylindrical about the axis X.

The outer surface of the central portion 51 of the diaphragm has a conical portion 73 parallel to the top conical portion 70 and connecting via a step 74 parallel to the step 71 to a surface 75 formed by alternating sectors 76 and 71 that are circularly cylindrical about the axis X, but that hats different diameters.

Figure 7:
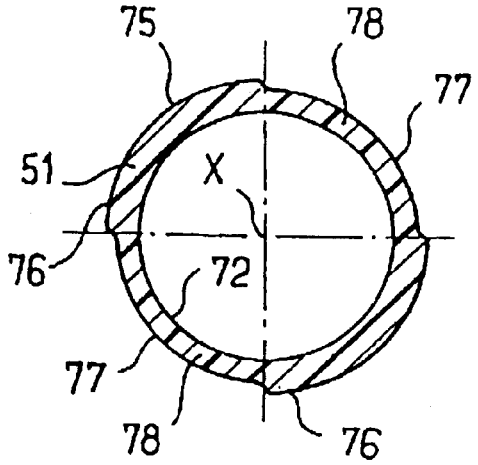
FIG. 7 is a section on section line VII-VII of FIG. 5.

More particularly, and as can be seen in FIG. 7, there are two sectors 77 each occupying 90°, they are diametrically opposite, and they are of a diameter that is smaller than the diameter of the sectors 76.

Figure 8:
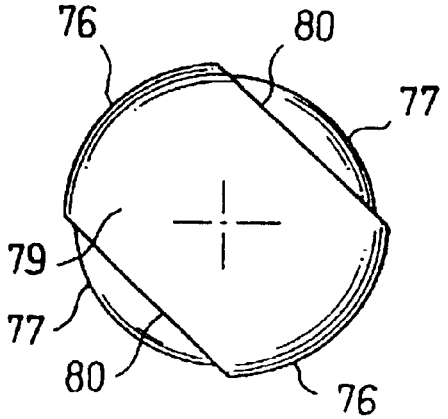
FIG. 8 is a view from beneath of the central portion of the diaphragm seen looking along arrow VIII of FIG. 5.

The sectors 77 co-operate with the cylindrical inside surface 72 to define two diametrically opposite thin zones 78 whose function is described below. The sectors 76 are united by a strip 79 extending over the bottom face of the end wall 70 and having parallel sides 80, as can be seen in FIG. 8.

The inside surface 56 of the flexible lip 53 is conical, converging upwards, as can be seen in FIG. 5.

Starting from its bottom end, the outside surface of the flexible lip 53 has a bottom portion 81 that is substantially circularly cylindrical about the axis X, followed by an upwardly divergent conical upper portion 82, said upper portion 82 being connected via a shoulder 83 to an annular rib 84.

As can be seen in FIG. 5, the annular portion 85 which unites the flexible lip 53 to the central portion 51 is relatively wide and thick, thus making it possible to ensure that the top end of the central portion 51 is indeed held stationary relative to the inner Skirt 20 when the central portion 51 is stretched.

In the embodiment described, the annular portion 85 is about twice as wide as it is thick, outside the bulges The thickness $e_1$ of the end wall 52 in the example described is substantially the same as the thickness $e_2$ of the side wall of the central portion 51 between the surfaces 73 and 70, and outside the bulges 55.

The thickness $e_3$ of the central portion 51 measured between the surfaces 72 and 75 is about 0.75 times the thickness $e_2$ in the embodiment described.

By way of example, in the embodiment, the thickness $e_1$ is 0.55 mm, the thickness $e_2$ is 0.55 mm, and the thickness $e_3$ is 0.4 mm (thickness measured prior to the diaphragm being assembled in the pump).

When the pushbutton 5 is at rest, as shown in FIG. 1, the length of the central portion 51 of the diaphragm is about 3 times the initial length $1_o$ of the central portion 51, i.e. lengthening reaches 200%.

By way of example, when the diaphragm 50 is not assembled, the length $1_o$ measured between the end wall of the trough 54 and the top face of the end wall 53 is about 3 mm, and when the diaphragm is in place in the pump and the pushbutton is at rest, as shown in FIG. 1, the length of the central portion 51 is about 9 mm.

In the example described, at the end of the depression stroke of the pushbutton 5, the central portion 51 is lengthened by 350%.

In the example under consideration, the length of the central portion 51 is then about 13.5 mm, and down stroke of the pushbutton b being 4.5 mm.

During assembly, the central duct 32 of the pushbutton 5 is inserted into the central portion 51 of the diaphragm 50 until its bottom end bears against the end wall 52 of the diaphragm 50, as shown in FIG. 1.

In the example described, the bulges 55 then bear against the circularly cylindrical surface of the central duct 32. Nevertheless, in general, it is not essential for the bulges 55 to bear against the central duct 32 when the pushbutton is at rest.

While the pushbutton 5 is at rest, the central portion 51 of the diaphragm 50 is under tension, so as to hold the teeth 31 in abutment against the top edge 18 of the outer skirt 15.

The pair of sealing lips 24 bear in leakproof manner against the radially inner surface of the tubular skirt 33 regardless of the up or down movement of the pushbutton 5.

The radially inner surface of the central portion 51 of the diaphragm closes the radial openings 36 in the central duct 32.

At rest, the inside surface 56 of the flexible lip comes to bear against the inner skirt 20.

The support 4, the pushbutton 5, and the diaphragm 50 constitute a pump which operates as follows.

Figure 9:
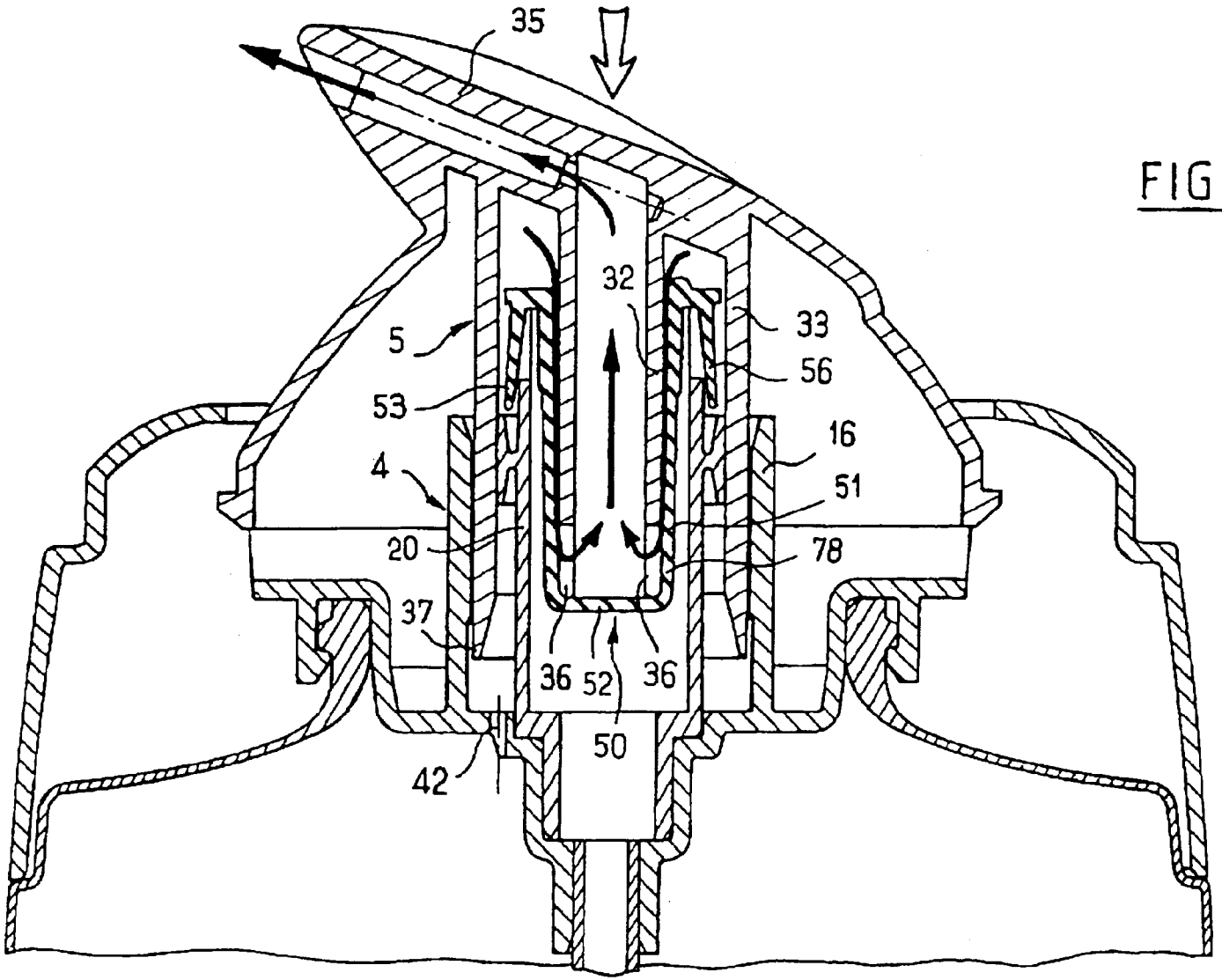
FIG. 9 shows how the pump operates when the pushbutton is depressed.

When the user presses down the pushbutton 5, as shown in FIG. 9, the central duct 32 drives the end wall 52 of the diaphragm 50 downwards, with the diaphragm deforming elastically and stretching so as to accompany the downward movement of the central duct 32.

It is assumed that the pump is primed, i.e. that the pump chamber 34 is full of substance.

During the downward movement of the pushbutton 5, the substance contained in the pump chamber 34 is expelled between the central duct 32 and the central portion 51 of the diaphragm, and it reaches the radial openings 36 of the central duct 32 and then the dispenser endpiece 35.

The inside surface 56 of the flexible lip 53 bears in leakproof manner against the inner skirt 20 during the downward movement of the pushbutton 5.

On reaching the annular setback 41 after the pushbutton 5 has been pushed down a certain distance, the sealing lip 37 of the tubular skirt 33 of the pushbutton 5 ceases to bear in leakproof manner against the guide skirt 16, thereby making communication possible between the inside of the receptacle and the outside via the air intake orifice 42 and the clearance that exists between the guide skirt 16 and the tubular skirt 33.

Between them, the bulges 55 leave passages for the substance arid prevent a leakproof annular barrier zone forming between the central duct 32 and the central portion 51 of the diaphragm 50 which might not be overcome by the pressure of the substance, so it is ensured that the substance can reach the radial openings 36, with the diaphragm 50 moving a little away from the central duct 32 in the vicinity of the top ends of the openings 36 under the effect of the pressure in the substance.

The existence of the thin zones 78 favors outward deformation of the side wall of the central portion 51 so as to allow the substance to penetrate in the radial openings 36.

The existence of the step 71 enables the substance to move down more easily along the central duct 32 as far as the radial openings 36 without running the risk of substance flow becoming blocked by the diaphragm 50.

The bulges 55 tend to hold the central duct 32 coaxially relative to the inner skirt 20 and to guarantee that the diaphragm hooks onto the inner skirt 20.

Went the user releases the pushbutton 5, the pushbutton is urged upwards by the central portion 51 of the diaphragm which tends to return to its initial shape.

Because of the thin zones 78, the central portion 51 can present relatively great thickness of material outside these zones, thereby enabling the central portion 51 to stretch while the diaphragm 50 is being put into place in the pump sufficiently to ensure that the return force obtained will enable the pushbutton 5 to rest without any risk of jamming.

During the return movement of the pushbutton 5, the central portion 51 of the diaphragm 50 closes the radial openings 36, and the suction which is created in the pump chamber 34 causes the flexible lip 53 of the inner skirt 20 to move away, and draws substance in from the receptacle.

The step 71 is situated above the top ends of the radial openings 36 so that during the return movement of the pushbutton 5, the surface 72 of the central portion 51 can close the radial openings 36.

Figure 10:
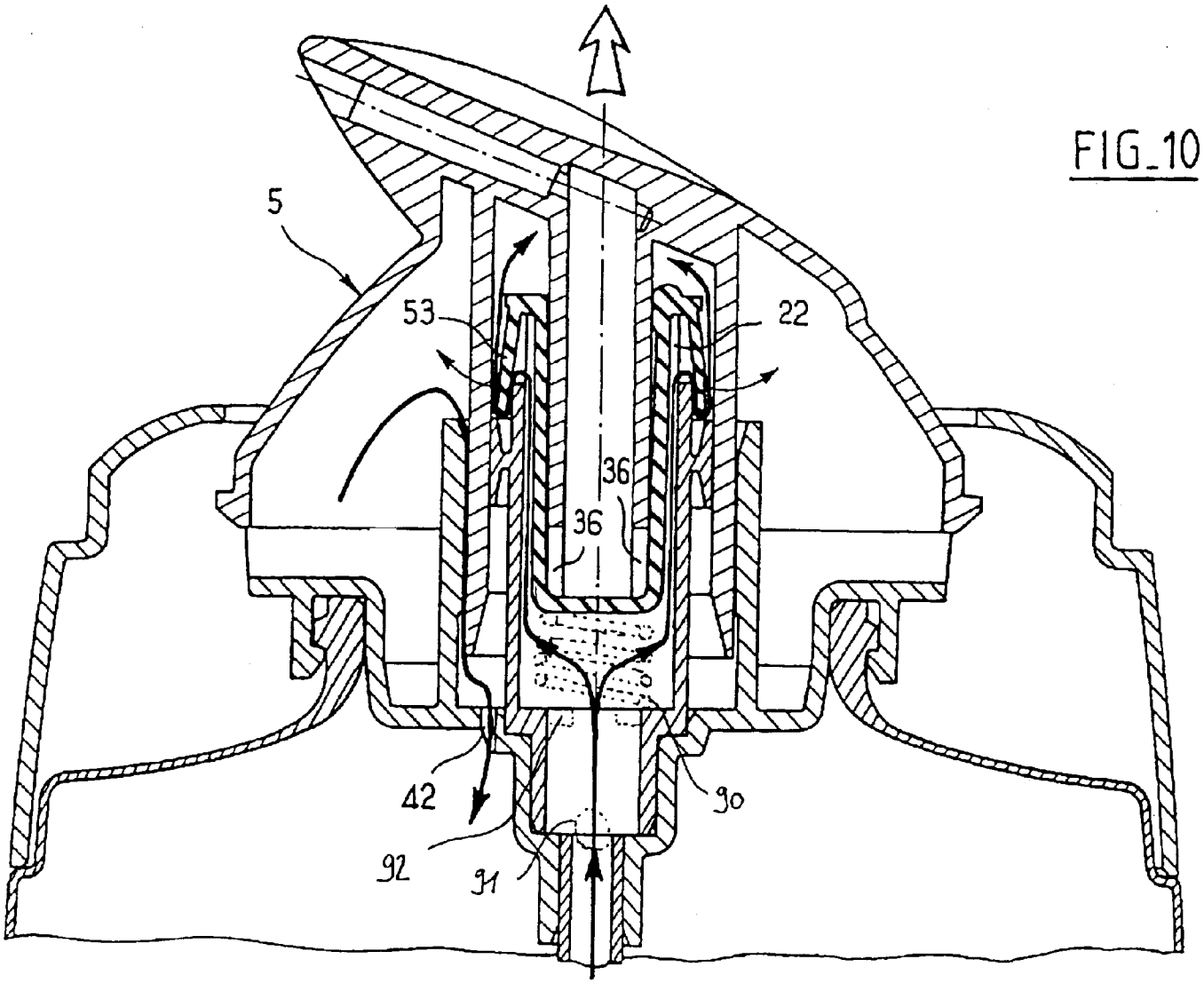
FIG. 10 shows how the pump operates when the pushbutton is released.

The substance reaches the pump chamber 34 by flowing via the grooves 25 of the inner skirt 20 along the central portion 51 of the diaphragm 50, passing through the inner skirt 20 via the openings 22, and then passing round the flexible lip 53 and rising outside it, as shown in FIG. 10.

While the pushbutton 5 is rising, air can penetrate into the receptacle via the clearance that exists between the guide skirt 16 and the tubular skirt 33 and via tire air intake orifice 42, and this continues until the sealing lip 37 bears again in leakproof manner against the guide skirt 16 when the pushbutton 5 reaches its high position, as explained above.

It will be observed that the relatively small thickness of the end wall 52 makes it possible to prevent the elastomer material from which the diaphragm is made rolling into a rim under the thrust of the central duct 32, where such a rim could press against the inside surface of the inner skirt 20 and give rise to friction that is harmful to proper operation of the pump.

Naturally, the invention is not restricted to the embodiment described above.

Figure 11:
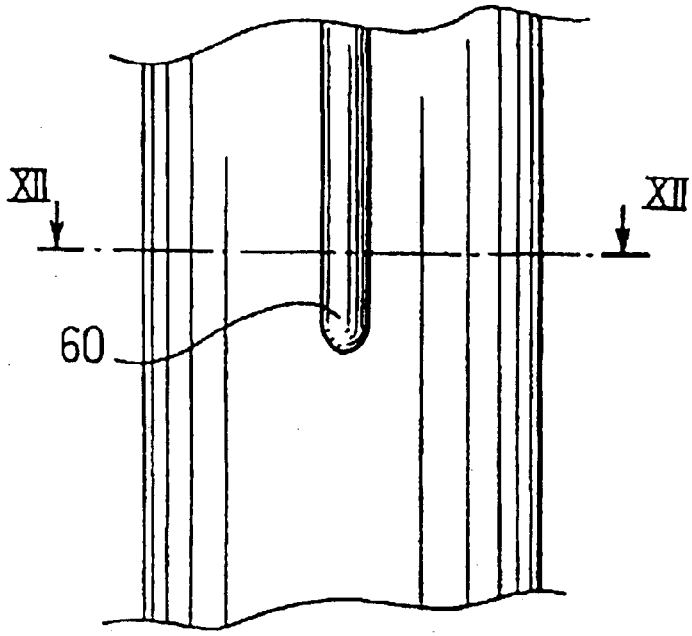
FIG. 11 is a fragmentary and diagrammatic view of the central duct of a pushbutton in a variant implementation of the invention.
Figure 12:
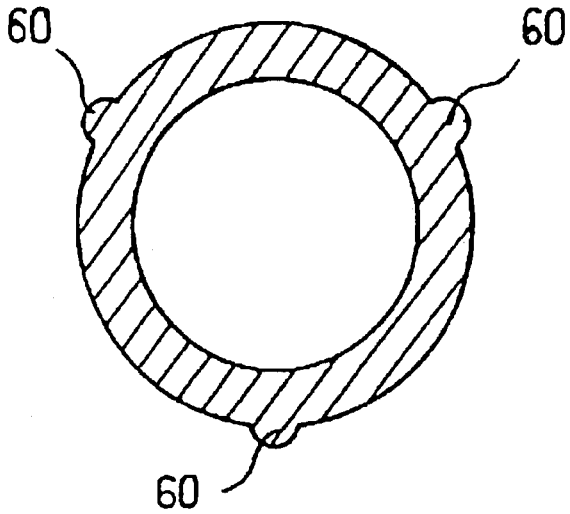
FIG. 12 is a cross-section on section line XII-XII of FIG. 30.

In particular, it is possible to use a diaphragm in which the radially inner surface of the top portion of the central portion is circularly symmetrical, with the bulges 55 being replaced by bulges 60 formed on the top portion of the central duct 32, as shown in FIGS. 11 and 12.

It is also possible to assist or cause the pushbutton to undertake its return movement by means of a helical spring 90 as shown in dashed lines in FIG. 10.

The spring is received inside the inner skirt 20, it works in compression, and its bottom end bears against the setback 26 while its top end bears against the bottom face of the end wall 52 of the membrane.

It is also possible to place a non-return valve upstream from the membrane, said valve opening while the substance is being sucked into the pump chamber and presenting a leak so as to avoid preventing the moving member from moving while a quantity of substance is being dispensed.

The valve can be implemented, for example, by means of a ball 91 as shown in dashed lines in FIG. 8, with the endpiece 12 serving as a seat.

Portions in relief 92 are formed on the inner surface of the inner skirt so as to hold the ball 91 close to its seat.

The ball 91 is selected to be very rough so as to crate a leak that ensures that the downward movement of the central portion of the membrane is not impeded while a quantity of substance is being dispensed.

The ball 91 makes it possible to prime the pump by actuating the pushbutton a few times.

The membrane may also be made out of at least two different materials.

Thus, to make the flexible lip 53, it is possible to use a material that is softer than the material used for making the spring-forming portion 51.

By way of example, the same elastomer can be used but with differing quantities of filler.

By using different materials, it is possible to use a material which is relatively hard for the central portion 51, which is favorable to obtaining a good spring effect, without thereby impending operation of the flexible lip 53.

In an embodiment that is not shown, a helical spring is placed around the central duct and has its bottom end bearing against the top end of the membrane while its top end bears against the pushbutton 5.

What is claimed is:

1. A pump [of type] comprising:

*a support,* a moving member mounted to move relative to [a] *said* support, the moving member having a central duct into which [the] *a* substance to be dispensed penetrates via at least one opening, the support cooperating with the moving member to define a variable volume pump chamber around said central duct,

[the pump also having] a diaphragm having a [central portion in the form of] a sleeve *with a top and a lower ends* that is open at [its] *the* top end and closed at [its bottom] *the lower* end, said central duct being inserted in said [central portion] *sleeve*, the diaphragm being [organized in such a manner as] *configured* to isolate the *at least one* opening[s] of the pump chamber when the volume of the pump chamber increases [arid] *and* the substance is sucked [into it] *therein*, wherein the [bottom] *lower* portion of the [central portion of the diaphragm] *sleeve* presents, at least over a sector of its periphery, [a] *at least one* preferred deformation zone.

2. A pump according to claim 1, wherein said *at least one* preferred deformation zone is constituted by a thin zone.

3. A pump according to claim 2, wherein [the bottom] *a* portion of the [central portion of the diaphragm] *sleeve* has at least two diametrically opposite thin zones.

4. A pump according to claim 2, wherein the thin zone is formed by reducing the thickness of the diaphragm by at least 20%.

5. A pump according to claim 1, wherein the inside surface of the [central portion of the diaphragm presents] *sleeve comprises* an inwardly-directed step.

6. A pump according to claim 5, wherein said step is situated level with [the top] *the first* end of the preferred deformation zone(s).

7. A pump according to claim 1, wherein the diaphragm has a flexible lip suitable firstly for isolating the pump chamber from the source of substance when the volume of said pump chamber deceases, and secondly for enabling substance to enter into said pump chamber when the volume thereof increases.

8. A pump according to claim 7, wherein said flexible lip is connected to the [central portion of the diaphragm] *sleeve* by forming a downwardly open annular trough, and wherein the support [includes] *comprises* an inner skirt having [its] *the* top end bearing against [the] *an* end wall of said trough to retain the diaphragm when the moving member is moved downwards to decrease the volume of the pump chamber.

9. A pump according to claim 8, wherein the inner skirt is a portion of a piece fitted to the remainder of the support.

10. A pump according to claim 9, wherein the support has a pair of sealing lips bearing in leakproof manner on a tubular skirt of the moving member, said tubular skirt being downwardly open and extending around the central duct concentrically thereabout, said tubular skirt also defining the pump radially outer wall of the pump chamber.

11. A pump according to claim 10, wherein the tubular skirt of the moving member *is configured to* slide[s] inside a guide skirt of the support, co-operating with the inner skirt of the support to define an upwardly open annular trough which communicates with the source of substance via at least one air intake orifice, the tubular skirt of the moving member bearing in leakproof manner against said guide skirt [(16)] when the moving member is at rest and the volume of the pump chamber is at a maximum.

12. A pump according to claim 10, wherein said inner skirt has openings at [its] *the* top end, the openings being of a height that is less than the height of the flexible lip, said openings enabling the substance to reach the pump chamber when the volume thereof increases and the flexible lip moves away from the inner skirt under the effect of thrust from the substance flowing towards the pump chamber.

13. A pump according to claim 8, wherein the height of the flexible lip is greater than or equal to the height of the [central portion of the diaphragm]*sleeve*, prior to the diaphragm being assembled in the pump.

14. A pump according to claim 8, wherein the flexible lip is of thickness that increases going towards the top end of the [diaphragm]*sleeve*.

15. A pump according to claim 8, wherein the outside surface of the flexible lip presents, starting from its bottom end, a [bottom] *first* portion that is circularly cylindrical about the axis of the central portion of the diaphragm, followed by [an upper] *a second* portion that is conical and diverges towards the top end of the [diaphragm]*sleeve*, which [upper] *second* portion is connected via a shoulder to an annular rib.

16. A pump according to claim 8, wherein the inside diameter of the flexible lip is equal to the outside diameter of the inner skirt, ignoring manufacturing tolerances.

17. A pump according to claim 16, wherein the clearance between the flexible lip and the inner skirt is negative or zero.

18. A pump according to claim 1, wherein the [central portion of the diaphragm] *sleeve* is connected at [its] *the* top end to an annular portion whose width and thickness are selected in such a manner as to improve retention of the diaphragm when said [central portion] *sleeve* is stretched.

19. A pump according to claim 18, wherein the thickness of said annular portion, prior to the diaphragm being assembled in the pump, is greater than or equal to the thickness of the [diaphragm in its central portion]*sleeve*.

20. A pump according to claim 18, wherein said annular portion, prior to the diaphragm being assembled in the pump, is at least 1.5 times wider than it is thick.

21. A pump according to claim 1, [wherein the] *said sleeve having an* end wall[of the central portion of the diaphragm], *wherein said end wall of the sleeve*, prior to the diaphragm being assembled in the pump, presents substantially the same thickness as [the] *said* side wall of the [central portion of the diaphragm] *sleeve* outside said [preferred] *at least one* deformation zone(s).

22. A pump according to claim 1, *said sleeve having an end wall,* wherein the thickness of the end wall of the [central portion of the diaphragm] *sleeve* corresponds to within 20% of the thickness of the side wall of the [central portion of the diaphragm] *sleeve* outside said [preferred] *at least one* deformation zone(s), prior to the diaphragm being assembled in the pump.

23. A pump according to claim 1, *said sleeve having an initial length prior to assembly in the pump* wherein, when the moving member is at rest, the length of the [central portion of the diaphragm] *sleeve* after being assembled in the pump is greater than or equal to 1.5 times its initial length [prior to assembly in the pump].

24. A pump according to claim 1, *said sleeve having an initial length prior to assembly in the pump* wherein, when the moving member is fully depressed, the length of the [central portion of the diaphragm] *sleeve* is greater than or equal to twice the initial length of the [diaphragm prior to assembly in the pump]*sleeve*.

25. A pump according to claim 1, wherein at least one of the diaphragm and the central duct is [shaped] *configured* to prevent an annular zone forming between the diaphragm [arid] *and* the central duct that would prevent the substance contained in the pump chamber from flowing via said central duct when the volume of the pump chamber decreases.

26. A pump according to claim 25, wherein at least one of the diaphragm and the central duct is [shaped so as] *configured* to bear against the other of the central duct and the diaphragm at predetermined locations of its periphery, at least during displacement of the moving member relative to the support.

27. A pump according to claim 26, wherein at least one of the diaphragm and the central duct has portions in relief against which the other of the central duct and the diaphragm comes to bear, at least during displacement of the moving member relative to the support.

28. A pump according to claim 27, wherein said portions in relief are made on the diaphragm.

29. A pump according to claim 1, wherein the central duct of the moving member is provided with at least one radial opening at [its bottom] *an* end.

30. A pump according to claim 1, wherein the moving member constitutes a pushbutton, the central duct being integrally formed with a dispenser endpiece.

31. A pump according to claim 1, wherein the diaphragm is made of *at least one of* a nitrile elastomer [or of] *and* a silicone elastomer.

32. A pump according to claim 1, having a return spring for retuning the moving member towards an initial position after a quantity of substance has been dispensed.

33. A pump according to claim 32, wherein the return spring is constituted by a helical spring working in compression.

34. A pump according to claim 33, *said diaphragm having an axis* wherein the spring is disposed on the axis of the [membrane] *diaphragm* so that the top end of the spring bears against the [bottom end of the central portion of the membrane] *lower end of the sleeve*.

35. A pump according to claim 1, including a nonreturn valve upstream from the [membrane]*diaphragm*, said valve opening while substance is being sucked into the pump chamber, and presenting a leak so as to avoid preventing displacement of the moving member while a quantity of substance is being dispensed.

36. A pump according to claim 1, wherein the [membrane] *diaphragm* is made of at least two different materials.

37. A pump according to claim 7 *said diaphragm having a spring forming portion*, wherein the [membrane] *diaphragm* is made of at least two different materials, and wherein the flexible lip is made of a material that is softer than [the] *said* spring-forming portion [of the membrane].

38. A receptacle fitted with a pump as defined in claim 31.

39. A pump according to claim 2, wherein the thin zone is formed by reducing the thickness of the diaphragm by at least 25%.

40. A pump according to claim 18, wherein said annular portion, prior to the diaphragm being assembled in the pump, is at least twice as wide as it is thick.

41. A pump according to claim 1, *said sleeve having an initial length prior to assembly in the pump* wherein, when the moving member is at rest, the length of the [central portion of the diaphragm] *sleeve* after being assembled in the pump is greater than or equal to twice [its] *said* initial length [prior to assembly in the pump].

42. A pump according to claim 1, *said sleeve having an initial length prior to assembly in the pump* wherein, when the moving member is at rest, the length of the [central portion of the diaphragm] *sleeve* after being assembled in the pump is greater than or equal to 3 times [its] *said* initial length [prior to assembly in the pump].

43. A pump according to claim 1, *said sleeve having an initial length prior to assembly in the pump* wherein, when the moving member is fully depressed, the length of the [central portion of the diaphragm] *sleeve* is greater than or equal to 3 times [the] *said* initial length [of the diaphragm prior to assembly in the pump].

44. A pump according to claim 1, *said sleeve having an initial length prior to assembly in the pump* wherein, when the moving member is fully depressed, the length of the [central portion of the diaphragm] *sleeve* is greater than or equal to 4 times [the] *said* initial length [of the diaphragm prior to assembly in the pump].

45. A pump according to claim 27, wherein said portions in relief are made on the diaphragm and are constituted by bulges uniformly distributed around the axis of the [central portion of the diaphragm] *sleeve* at its opening, said bulges extending over the top face of the diaphragm.

* * * * *